(12) United States Patent
Hicks et al.

(10) Patent No.: US 8,620,603 B1
(45) Date of Patent: Dec. 31, 2013

(54) FLUID LEVEL SENSING

(75) Inventors: Kimberly P. Hicks, Kent, WA (US); David M. Van Leuven, Seattle, WA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 13/046,415

(22) Filed: Mar. 11, 2011

(51) Int. Cl.
*G01F 23/26* (2006.01)

(52) U.S. Cl.
USPC .............................. 702/55; 702/52; 73/290 R

(58) Field of Classification Search
USPC .................... 702/55, 52; 73/290 R, 290 V
See application file for complete search history.

(56) References Cited

U.S. PATENT DOCUMENTS

| | | | | |
|---|---|---|---|---|
| 3,389,602 A | * | 6/1968 | Clemens | 73/290 R |
| 4,819,483 A | * | 4/1989 | Emplit et al. | 73/304 C |
| 4,898,030 A | | 2/1990 | Yeh | |
| 4,908,776 A | * | 3/1990 | Crill et al. | 702/55 |
| 4,994,749 A | * | 2/1991 | Davies et al. | 324/637 |
| 5,064,153 A | | 11/1991 | Gindre et al. | |
| 5,071,093 A | * | 12/1991 | Perdu | 244/135 R |
| 6,055,485 A | * | 4/2000 | Eun et al. | 702/50 |
| 6,305,219 B1 | | 10/2001 | Bentz et al. | |
| 6,571,624 B1 | | 6/2003 | Grayson et al. | |
| 2010/0266790 A1 | * | 10/2010 | Kusinski et al. | 428/34.6 |

OTHER PUBLICATIONS

Yendler, Review of Propellant Gauging Methods, 44th AIAA Aerospace Sciences Meeting and Exhibit, Reno, Nevada, Jan. 2006, American Institute of Aeronautics and Astronautics, Inc., (7 pgs).
Kreppel, Scaling and Modeling of Propellant Sloshing and Zero Gravity Equilibrium for the Orion Service Module Propellant Tanks (senior thesis), May 21, 2010, Department of Physics, Carthage College, Kenosha, Wisconsin (17 pgs).

* cited by examiner

*Primary Examiner* — Jonathan C Teixeira Moffat
*Assistant Examiner* — Stephanie Bloss
(74) *Attorney, Agent, or Firm* — Toler Law Group, PC

(57) ABSTRACT

A tank to contain a fluid includes a tank wall having an inner surface. A vane is disposed within the tank. The vane is configured to facilitate extraction of fluid from the tank. The vane may include an electrically conductive material. The tank also includes a first connector to electrically couple at least one portion of the tank wall to a capacitance sensing device and a second connector to electrically couple at least one portion of the vane to the capacitance sensing device.

20 Claims, 5 Drawing Sheets

US 8,620,603 B1

FLUID LEVEL SENSING

FIELD OF THE DISCLOSURE

The present disclosure is generally related to fluid level sensing.

BACKGROUND

Accurate determination of a quantity of a fluid inside a tank can be difficult. For example, certain methods of estimating an amount of a liquid propellant that remains in a satellite's fuel tank may not have a desired accuracy. When mission planners do not know with a high degree of confidence how much fuel is left in the satellite's fuel tank, the satellite may be retired prematurely, which may be wasteful of the remaining fuel and of remaining useful life of the satellite.

SUMMARY

Systems and methods to determine an amount of a fluid remaining in a tank are disclosed. The disclosed systems and methods are accurate and do not require that new hardware be added to the tank.

In a particular embodiment, a tank to contain a fluid includes a tank wall having an inner surface. A vane is disposed within the tank. The vane is configured to facilitate extraction of fluid from the tank. The vane may include an electrically conductive material. The tank also includes a first connector to electrically couple at least one portion of the tank wall to a capacitance sensing device and a second connector to electrically couple at least one portion of the vane to the capacitance sensing device. When the capacitance sensing device is coupled to the first connector and to the second connector, the capacitance sensing device can measure a capacitance between the at least one portion of the vane and the at least one portion of the tank wall. When the fluid stored in the tank is electrically conductive, an electrically insulating layer may be provided on a surface of a hardware component inside the tank to prevent electrical shorting between the vane and the tank wall.

In another particular embodiment, a mobile platform (such as a satellite) includes a tank coupled to the mobile platform. A vane is disposed within the tank and configured to facilitate extraction of liquid from the tank. The vane includes an electrically conductive material. An electrically insulating layer may be disposed between the vane and an inner surface of a wall of the tank. The satellite also includes a capacitance sensing device coupled to the tank and to the vane. The capacitance sensing device is configured to measure a capacitance between the vane and the inner surface of the wall of the tank.

In another particular embodiment, a method includes receiving information indicative of a capacitance between an inner surface of a wall of a tank and a vane disposed within the tank. The vane includes an electrically conductive material. A capillary channel between the vane and the inner surface of the wall may facilitate extraction of liquid from the tank. The method also includes determining an amount of the liquid that is in the tank based on the capacitance.

The features, functions, and advantages that have been described can be achieved independently in various embodiments or may be combined in yet other embodiments, further details of which are disclosed with reference to the following description and drawings.

DETAILED DESCRIPTION

Figure 1:
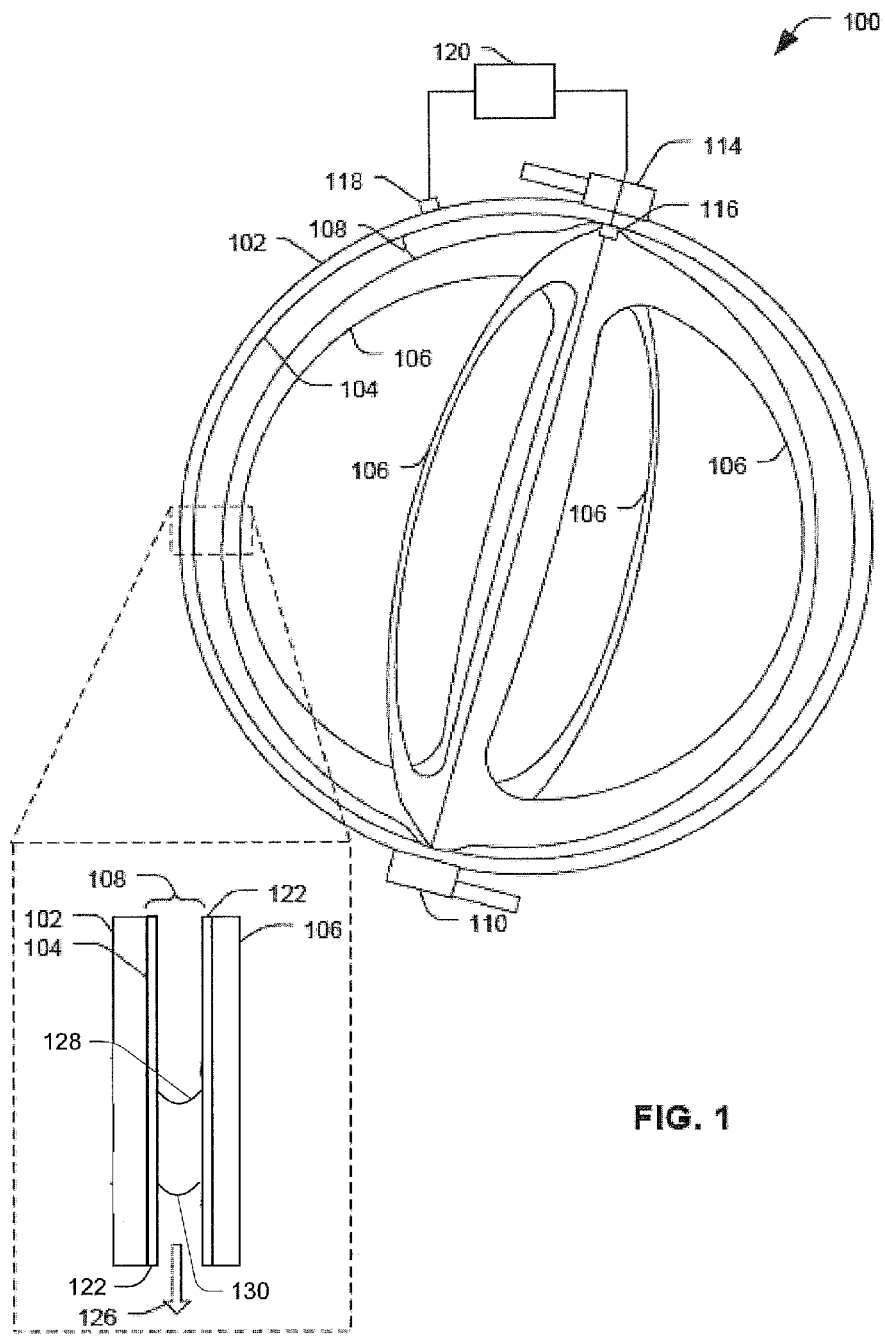
FIG. 1 is a diagram illustrating a particular embodiment of a tank.

Generally, a satellite may be removed from its orbital position to a parking location or de-orbited before all fuel onboard the satellite is used. This allows the satellite's orbital location to be used by a future satellite and prevents accumulation of debris in useful orbits. Accordingly, the satellite may be prematurely retired by removing the satellite from its orbit when uncertainty regarding the amount of fuel left onboard the satellite becomes too large. Certain methods of estimating an amount of fuel left in a satellite fuel tank may lead to considerable uncertainty. For example, a "book-keeping" method may rely on users to accurately calculate and record each fuel use (e.g., when thrusters were burned, a length of time the thrusters were burned, and thrust and flow rates the thrusters produced). With this data, the users can estimate fuel used and subtract the used fuel from a starting fuel amount that was originally put into the tank. Using the book keeping method, measurement errors regarding fuels usage or errors in logging fuel usage may lead to early retirement of the satellite (e.g., while it still has sufficient fuel onboard to remain in orbit).

In another example, a gas law estimation technique may use the Ideal Gas Law (or another gas law) to estimate fuel volume in the tank. To illustrate, temperature and pressure readings may be taken from the fuel tank. The pressure readings may be readings of pressure due to a pressurizing gas (e.g., Helium) in the tank. The fuel volume remaining in the tank may be estimated by first using a gas law equation to estimate a volume of pressurizing gas that is in the tank. The volume of the pressurizing gas is subtracted from the total volume of the tank to estimate fuel volume remaining.

In yet another example, a thermal propellant gauging method may be used. The thermal propellant gauging method is based upon the concept of measuring a thermal capacitance of the tank (including the fuel and pressurizing gas). The tank and its contents are subjected to heating. An observed temperature rise due to the heating is compared to simulated tank thermal model results. This model is based on a thermal model of a fuel tank that includes a first node for a gas portion of contents of the propellant tank and a second node for a liquid portion of the contents of the propellant tank. The amount of fuel left in the tank is estimated based on the comparison to the simulated tank thermal model results.

Errors that can occur using the book-keeping, gas law and thermal propellant gauging methods may lead to leaving the satellite in a useful orbit after the satellite does not have sufficient fuel remaining to safely park or de-orbit the satellite. To avoid this situation, safety margins are generally built into procedures so that sufficient fuel is available to park the satellite for retirement. However, these safety margins increase the likelihood of the satellite being retired too early.

Further, the gas law and thermal response methods described above require addition of equipment to the tank. For example, temperature and pressure sensors may be needed to calculate the amount of fuel in the tank using the gas law method. To use the thermal response method, temperature sensors and heaters may be used. This added equipment can increase weight of the satellite, which increases cost. Additionally, adding this equipment to the tank can increase complexity and cost of the tank.

FIG. 1 is a diagram illustrating a particular embodiment of a tank, designated 100. The tank 100 may be adapted to contain a fluid, such as a liquid fuel. For example, the tank 100 may be configured to store a liquid fuel used by a space-based vehicle, an airborne vehicle, a land-based vehicle or a water-based vehicle.

The tank 100 may include a tank wall 102. The tank wall 102 may be formed of various materials depending upon, among other things, the particular application and operating environment of the tank 100. For example, the tank wall 102 may be constructed of a metal, a polymer, a composite material, a ceramic material, another material, or a combination of materials. In a particular embodiment, at least a portion of an inner surface 104 of the tank wall 102 includes an electrically conductive material, such as a metal.

One or more vanes 106 are disposed within the tank 100. When the tank 100 is a fuel tank, the vanes 106 may be plates that are used for fuel management. For example, the vanes 106 may use properties of fluid physics to direct fuel to the tank wall 102 to be used by a spacecraft that is in orbit. At least one of the vanes 106 is configured to facilitate extraction of fluid from the tank 100 (e.g., via an outlet 110 of the tank 100). The vanes 106 and the inner surface 104 of the tank wall 102 may form boundaries of a capillary channel 108. The capillary channel 108 may facilitate movement of the fluid toward the outlet 110 of the tank 100. For example, the fluid may be moved along the capillary channel 108 by capillary action 126.

To illustrate, in a microgravity environment, such as onboard an orbiting space-based vehicle, fluid feed mechanisms that rely on gravity either to extract fluid from the tank 100 or to cause the fluid to settle near the outlet 110 may be ineffectual. However, the capillary channel 108 may utilize the capillary action 126 to urge the fluid toward the outlet 110 and may thus facilitate extraction of the fluid from the tank 100 even in a microgravity environment.

The capillary action 126 is driven by material properties of the fluid and materials around the fluid, such as a material of the inner surface 104 of the tank wall 102, a material of the vanes 106 (or a coating on the vanes 106), and possibly other materials that may be in contact with the fluid, such as a pressurizing fluid. Accordingly, the fluid, the tank wall 102 (in particular the inner surface 104 of the tank wall 102), and the vanes 106 may be formed of materials that provide appropriate surface tension and contact angle to facilitate driving the fluid toward the outlet 110 of the tank 100. Additionally, the materials used for the fluid, the tank wall 102 (in particular the inner surface 104 of the tank wall 102), and the vanes 106 may be chemically stable (e.g., substantially non-reactive with one another).

Further, a geometric configuration of the inner surface 104 of the tank wall 102 and the vanes 106 may be designed to urge the fluid toward the outlet 110. To illustrate, spacing between the inner surface 104 of the tank wall 102 and the vanes 106 may be selected to provide a capillary action force in a direction toward the outlet 110.

In a particular embodiment, an insulating layer 122 may be provided on the inner surface 104 of the tank wall 102, the vanes 106, or both. For example, the insulating layer 122 may include a polymer coating. The insulating layer 122 may electrically insulate the tank wall 102 from the vanes 106. In some embodiments, the vanes 106 may be structurally attached to the tank wall 102, to other components of the tank 100 (e.g., to attachment points at an inlet 114 and the outlet 110 of the tank 100), or a combination thereof. In some such embodiments, the insulating layer 122 may be provided only at these structural attachment points. In these embodiments, physical separation of the tank wall 102 and the vanes (e.g., via the capillary channel 108) may provide electrical isolation of the tank wall 102 and vanes 106 in areas other than the structural attachment points. For example, when the fluid to be stored in the tank 100 is not electrically conductive, providing the insulating layer 122 only at the structural attachment points may be sufficient. In other embodiments, such as when the fluid to be stored in the tank 100 is conductive, the insulating layer 122 may substantially cover the inner surface 104 of the tank wall 102, the vanes 106, or both. In these embodiments, a material of the insulating layer 122 may be selected to have desired material properties, such as a contact angle with the fuel that facilities the capillary action 126, chemical stability, dielectric constant, and so forth.

In some embodiments, the material used for the insulating layer 122 is highly corrosion-resistant (e.g., able to withstand a corrosive environment of a satellite fuel tank for 15-20 years). In a particular embodiment, when the fluid to be contained in the tank is an electrical insulator, no insulating layer 122 may be used. Alternately, the insulating layer 122 may be present even when the liquid is an insulator since the insulating layer 122 may also provide other desired material properties, such as corrosion resistance. In a particular embodiment, suitable materials for the insulating layer 122 may include, but are not limited to: AF-E-332 (a Hydrazine resistant coating) and Teflon.

In a particular embodiment, the vanes 106 are configured to inhibit sloshing of the fluid in the tank 100. In some embodiments, the vanes 106 provide structural support for the tank wall 102 to stabilize dimensional characteristics of the tank 100.

Since the inner surface 104 of the tank wall 102 and the vanes 106 may be electrically insulated from one another (e.g., by the capillary channel 108 and the fluid, by the insulating layer 122, or by a combination thereof), the tank wall 102 and the vanes 106 may act as a capacitor. In a particular embodiment, capacitance of the capacitor formed by the inner surface 104 of the tank wall 102 and the vanes 106 varies depending on how much fluid is in the tank 100. For example, the capacitance between the inner surface 104 of the tank wall 102 and the vanes 106 may decrease as an amount of fluid in the tank 100 decreases. To illustrate, when the tank 100 is full of the fluid, the inner surface 104 of the tank wall 102 and the vanes 106 may have a first capacitance. When none of the fluid remains in the tank (although another fluid, such as a pressurizing gas, may remain in the tank 100) the inner surface 104 of the tank wall 102 and the vanes 106 may have a second capacitance that is different than the first capacitance. Further, the capacitance between the inner surface 104 of the tank wall 102 and the vanes 106 may change according to a determinable function between the first capacitance and the second capacitance as the amount of fluid in the tank 100 is changed. For example, the function may be determined through experimentation to identify an empirical relationship between the capacitance and the amount of fluid in the tank 100. After the empirical relationship has been identified, the amount of fluid in the tank 100 may be calculated using the empirical relationship based on a measured capacitance between the inner surface 104 of the tank wall 102 and the vanes 106.

To illustrate, a capacitance sensing device 120 may be coupled to the tank wall 102 and to one or more of the vanes 106 (e.g., via one or more electrical connectors 116 and 118). Although an electrical connector 116 is shown in FIG. 1 as inside the tank 100, in certain embodiments, the electrical connector 116 may be external to the tank 100 and may be electrically coupled to a portion of one or more of the vanes 106. The capacitance sensing device 120 may measure the capacitance between at least one portion of the vane 106 and at least one portion of the tank wall 102. Alternately or in addition, the capacitance sensing device 120 may measure other information that is indicative of capacitance, such as a voltage between the tank wall 102 and the vanes 106. An amount of the fluid present in the tank 100 may be determined based on the measured capacitance. For example, the capacitor formed by the inner surface 104 of the tank wall 102 and the vanes 106 may be modeled as a parallel plate capacitor, either considering or ignoring fringe effects. To illustrate, modeling the capacitor as a parallel plate capacitor, a length of the capacitor may be effectively the same as the length around the edge of the vane 106 or the length around the corresponding inner surface 104 of the tank wall 102. When the tank is full, a single capacitor may be formed that includes a liquid dielectric (i.e., the fluid stored in the tank 100) throughout its length. As the liquid level decreases, two capacitors may be formed, one with the liquid dielectric and one with a gaseous dielectric (e.g., from a pressurizing gas in the tank 100). The gaseous dielectric may have a lower dielectric constant (i.e., relative permittivity) than the liquid dielectric. With the physical geometry of a capacitor held constant, the lower the dielectric constant, the lower the measurable capacitance. Thus, as the liquid level decreases, the total measurable capacitance decreases.

Figure 2:
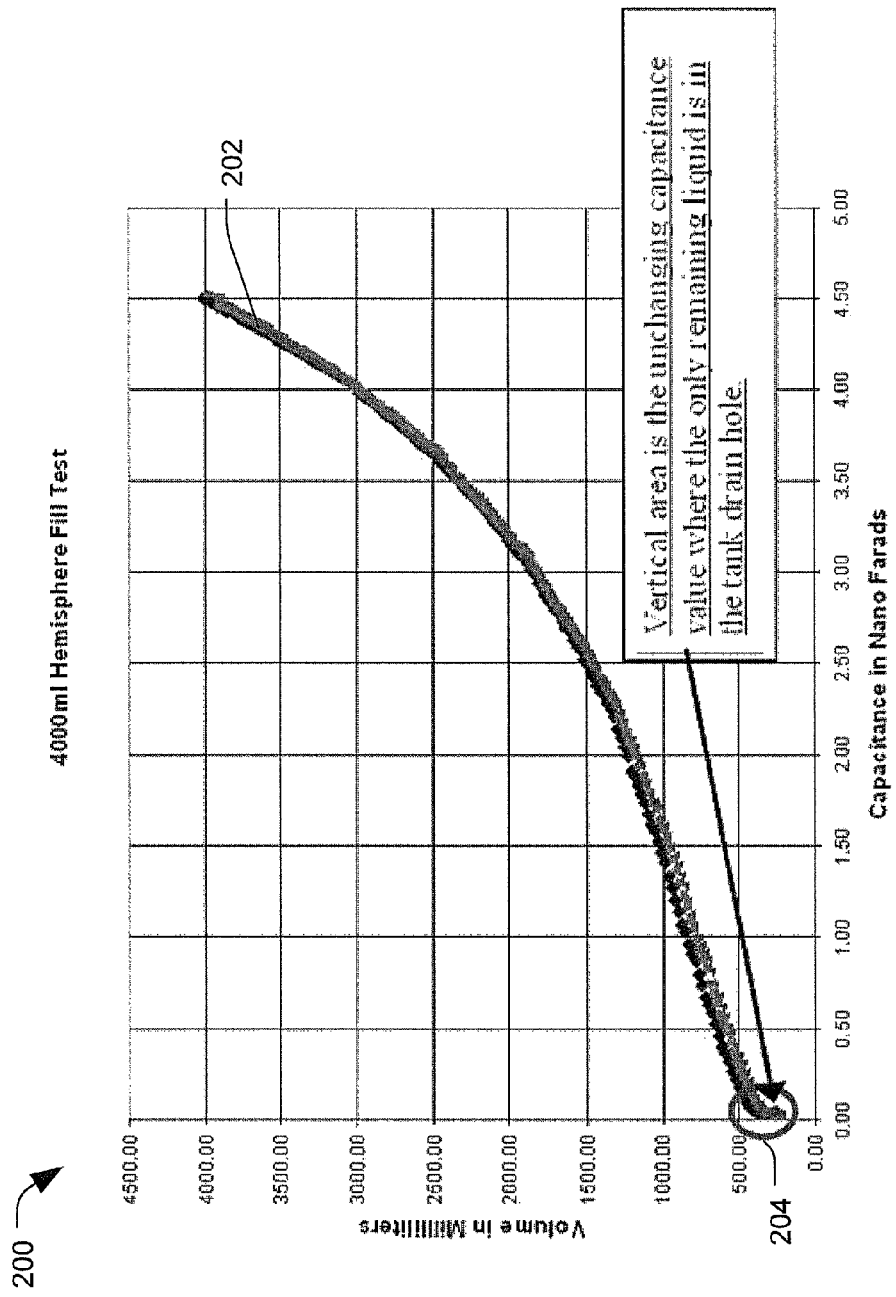
FIG. 2 is a graph illustrating a change in capacitance relative to a change in a fluid level in a tank according to a particular embodiment.

Alternately, the relationship between the capacitance of the capacitor formed by the tank wall 102 and the vanes 106 and an amount of fluid in the tank may be determined through testing, as shown in FIG. 2 and described in further detail below. For a more accurate understanding of the relationship, reduced gravity experiments may be conducted in addition to or instead of the bench top tests described with reference to FIG. 2.

In a particular embodiment, the capillary channel 108 is a part of the capacitor formed by the inner surface 104 of the tank wall 102 and the vanes 106. Due to material properties of the inner surface 104 of the tank wall 102, the vanes 106, the insulating layer 122, the fluid, or a combination thereof, the fluid may fill the capillary channel 108 while there is enough fluid in the tank 100 to fill the capillary channel 108 (with the some possible exceptions, such as when the fluid is dispersed in the tank as a result of movement of the tank 100). Thus, generally, as long as there is enough fluid in the tank 100 to fill the capillary channel 108, the capillary channel 108 will be filled with the fluid.

When there is not enough fluid in the tank 100 to fill the capillary channel 108, the fluid in the capillary channel 108 may break up and become discontinuous. The discontinuity of the fluid in the capillary channel 108 may cause a rate of change of the capacitance of the capacitor formed by the inner surface 104 of the tank wall 102 and the vanes 106 to increase. To illustrate, when the tank 100 has a relatively large amount of fluid (i.e., such that a continuous film of the fluid is present in the capillary channel 108) a relatively small change in the amount of fluid present in the tank 100 may cause a relatively small change in the capacitance since a continuous film of the fluid may remain present in the capillary channel 108 despite the change in the amount of fluid present in the tank 100. However, as the tank 100 approaches empty, a relatively small change in the amount of fluid present in the tank 100 (e.g., from a first level 128 to a second level 130) may cause a discontinuity in the film of the fluid in the capillary channel 108, which may cause a relatively large change in the capacitance. Accordingly, a relationship of the amount of fluid in the tank 100 to the capacitance between the tank wall 102 and the vane 106 may be more sensitive as the tank 100 approaches empty, providing improved fluid level measurement sensitivity as the tank empties.

Thus, the tank 100 may provide fluid level sensing (i.e., a measure of the amount of the fluid in the tank 100) without the addition of level sensing hardware inside the tank 100. As such, elements of the tank 100 that are present to enable operation of the tank 100, e.g., the tank wall 102 and the vanes 106, may be used to provide level sensing. Since no additional level sensing hardware is added to the tank 100, the tank 100 may be smaller, lighter, or both. Additionally, the tank 100 may provide improved fluid level measurement sensitivity as the tank 100 approaches empty, which may allow more of the fluid to be used without concerns regarding maintaining a minimum amount of fluid in reserve in the tank 100. For example, satellite operators may be expected to retain a fuel reserve that can be used at the end of a satellite's useful life to remove the satellite from a particular orbit. Thus, accurate measurement of fuel level as the satellite's fuel tank (e.g., the tank 100) approaches an empty state may extend the useful life of the satellite resulting in substantial cost savings and reduced waste.

FIG. 2 is a graph 200 illustrating a relationship between a change in capacitance and a change in fluid level in a tank according to a particular embodiment. Experimental measurements were performed to generate the graph 200. For the experimental measurements, an insulated vane was placed in a portion of a metal tank (approximately a bottom half of a tank). A measured volume of liquid was added to the tank. Water was used as the liquid for the experimental measurements. A portion of the tank and vane were connected to a capacitance meter and a capacitance measurement was taken with the known volume of liquid in the portion of the tank. A measured volume of the liquid was removed from the portion of the tank and another capacitance measurement was taken. This experimental process continued until the only liquid remaining in the tank was in the tank drain hole. The entire experimental process was repeated several times.

Lines 202 of the graph 200 illustrate experimental results of three tests in which capacitance between the tank and the vane was measured relative to the volume of liquid in the tank. Note that a slope of the lines 202 becomes shallower as the tank is emptied. This change in slope of the lines 202 corresponds to an increasing rate of change in capacitance per unit of liquid removed from the tank as the tank becomes empty. Stated another way, the changing slope of the lines 202 shows that as the tank empties, the capacitance becomes more sensitive to changes in the volume of fluid present in the tank. When the only fluid remaining in the tank was in the drain hole (in the area 204), the capacitance ceased to change since no fluid remained between the tank and the vane. That is, removal of the liquid in the drain hole did not change the capacitance of the tank and vane experimental apparatus.

Figure 3:
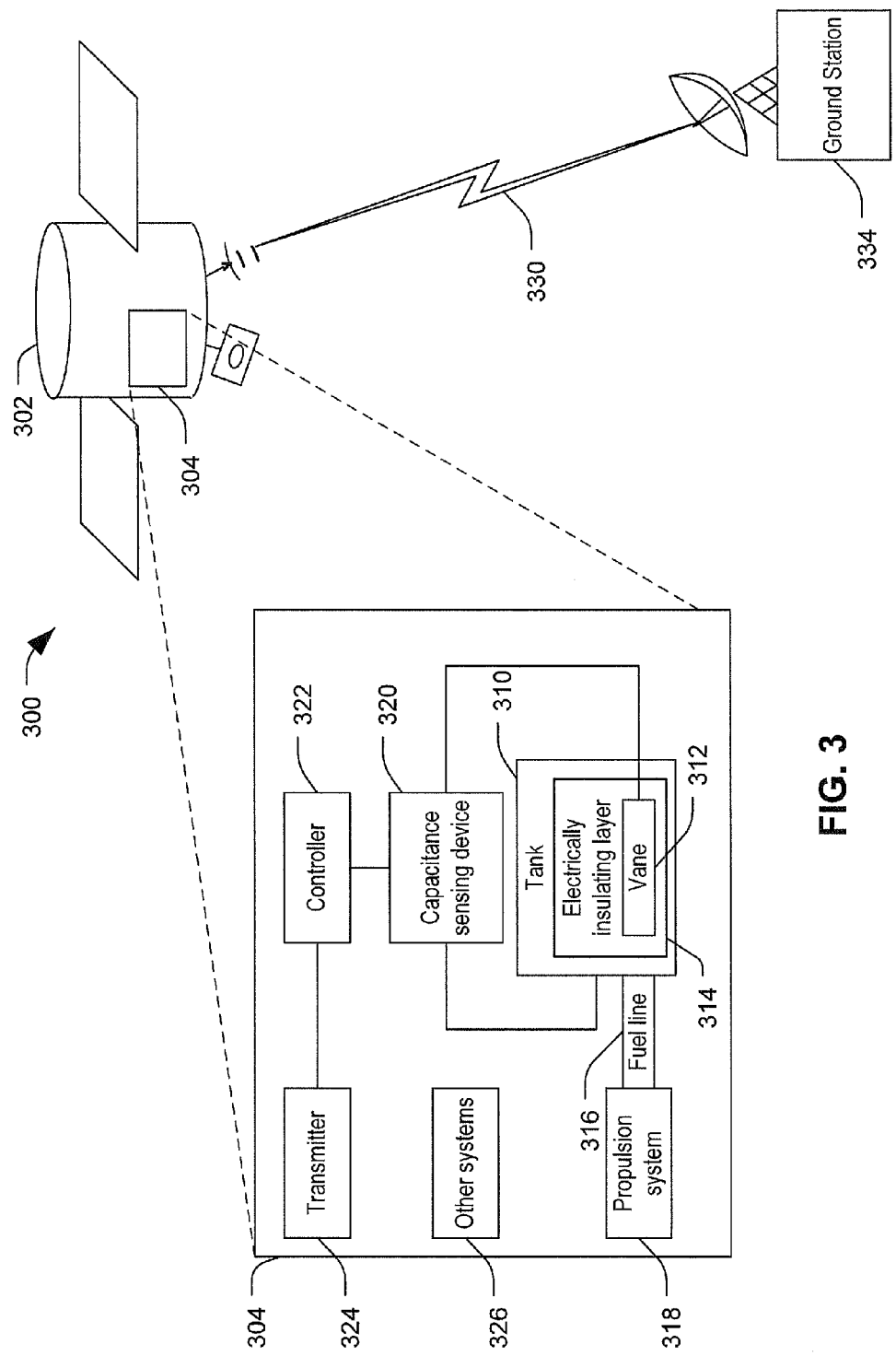
FIG. 3 is a diagram illustrating a particular embodiment of a mobile platform including a tank.

FIG. 3 is a diagram illustrating a particular embodiment of a mobile platform, such as a satellite 300, that includes a tank 310. The satellite 300 includes a satellite platform 302 (e.g., a body including structural components and, perhaps, a skin or covering). The satellite 300 may also include a plurality of onboard systems 304, a payload or a combination thereof.

The tank 310 may be coupled to the satellite platform 302. The tank 310 may be adapted to contain a fluid used by a system onboard the satellite 300. For example, the tank 310 may be a fuel tank to contain fuel used by a propulsion system 318 of the satellite 300. In another example, the tank 310 may contain another fluid that is provided to other systems 326 of the satellite 300 via a fluid delivery system (not shown). The other systems 326 may include, for example, communications systems, imaging systems, navigation systems, and so forth.

A vane 312 may be disposed within the tank 310. The vane 312 may be configured to inhibit sloshing of the liquid in the tank 310. The vane 312 may also be configured to facilitate extraction of liquid from the tank 310.

In a particular embodiment, the vane 312 includes an electrically conductive material and at least a portion of an inner surface of the wall of the tank 310 includes an electrically conductive material. An electrically insulating layer 314 may be disposed between the vane 312 and the inner surface of a wall of the tank 310. Thus, the vane 312 and the inner surface of the wall of the tank 310 may form a capacitor. The vane 312 and the wall of tank 310 may also form boundaries of a capillary channel that facilitate movement of the liquid in the tank to an outlet of the tank 310. For example, the capillary channel may facilitate movement of the liquid to an outlet of the tank 310 that is coupled to a fuel line 316 coupled to the propulsion system 318.

A capacitance sensing device 320 may be coupled to the tank 310 and to the vane 312. The capacitance sensing device 320 may be configured to measure a capacitance between the vane 312 and the inner surface of the wall of the tank 310. The capacitance between the vane 312 and the inner surface of the wall of the tank 310 may change as an amount of the liquid in the tank 310 changes. For example, the capacitance may change when a level of the liquid in the tank 310 is insufficient to fill the capillary channel.

The satellite 300 may also include a controller 322 coupled to the capacitance sensing device 320. The controller 322 may be configured to determine a liquid level in the tank 310 based on the capacitance measured by the capacitance sensing device 320. The satellite 300 may also include a transmitter 324 to send information to a ground-based receiver. For example, the transmitter 324 may send the information indicative of the measured capacitance via a satellite downlink signal 330 to a ground station 334. In another example, the transmitter 324 may send information indicative of an amount of fluid in the tank 310 to the ground station 334 via the satellite downlink signal 330.

Thus, an amount of fuel that remains in the tank 310 can be determined with confidence. Knowing the amount of fuel that remains in the tank 310 may extend the operational life of the satellite 300 since an operator of the satellite 300 can be confident that sufficient fuel remains to remove the satellite 300 from orbit. Additionally, the tank 310 provides fluid level sensing (i.e., a measure of the amount of the fluid in the tank) without the addition of level sensing hardware inside the tank 310. Rather, elements of the tank 310 that are present to enable operation of the tank 310, e.g., the tank wall and the vane 312, may also be used to provide fluid level sensing. Since no additional level sensing hardware is added within the tank 310, the tank 310 may be smaller, lighter, or both, which may reduce the cost of launching the satellite 300 relative to larger more complex tanks.

Figure 4:
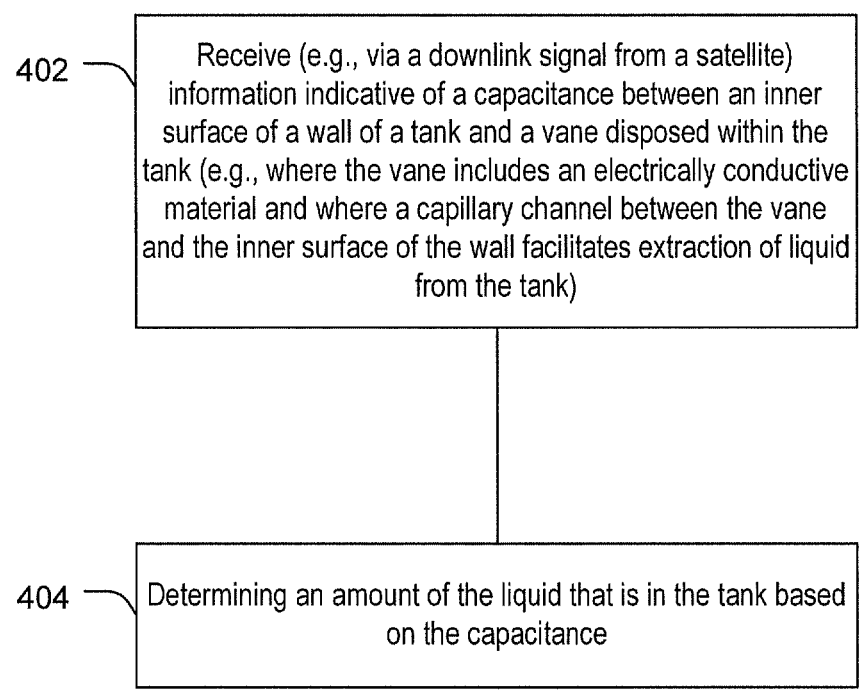
FIG. 4 is flow chart of a particular embodiment of a method of determining a fluid level in a tank.

FIG. 4 is flow chart of a particular embodiment of a computer-implemented method of determining a fluid level in a tank. The method of FIG. 4 may be implemented automatically, without human intervention. For example, the method may be performed by a computing device, such as a processor executing instructions or an application specific integrated circuit, as shown FIG. 5 and described in more detail below.

The method includes, at 402, receiving information indicative of a capacitance between an inner surface of a wall of a tank and a vane disposed within the tank. In an illustrative embodiment, the information indicative of the capacitance may include capacitance data transmitted from a satellite that houses that tank. For example, the information indicative of the capacitance may be received at a ground station, such as the ground station 334 of FIG. 3, via a downlink signal from a satellite, such as the satellite 300. In another illustrative embodiment, the information indicative of the capacitance may include a capacitance measurement that is received from a capacitance sensing device by a controller, such as the controller 332 onboard the satellite 302 of FIG. 3, or another computing device onboard the satellite 302. The information indicative of the capacitance may include digitized electrical values, such as capacitance, or other measurements that can be used to calculate the capacitance based on information about the tank, the vane, the fluid, other components of a system in which the tank is housed, or any combination thereof.

The vane may include an electrically conductive material. The inner surface of the wall of the tank may also include an electrically conductive material. An electrically insulating layer may be disposed on the inner surface of the wall of the tank, on the vane, or both. The vane may facilitate extraction of liquid from the tank. For example, a capillary channel between the vane and the inner surface of the wall of the tank may facilitate movement of the liquid to an outlet of the tank using capillary action.

The method may also include, at 404, determining an amount of liquid that is in the tank based on the capacitance. For example, the amount of liquid in the tank may be calculated or otherwise determined (e.g., via a lookup table) based on the capacitance. To illustrate, the capacitance may change (e.g., increase or decrease) as the amount of liquid in the tank decreases. A relationship between the capacitance and the amount of the liquid may be determined via testing. Sets of curves, such as the lines 202 of FIG. 2, may be prepared with different curves corresponding to different geometries of tank and vane design (i.e., spherical, rectangular, irregular, etc.), different fluids, different materials of construction (e.g., different tank wall materials, different vane materials, different insulating layer materials, etc.), other differences in particular systems, or any combination thereof. In some embodiments, "look-up" tables of capacitance values corresponding to fuel levels in tanks of different systems may be generated.

In an illustrative embodiment, fuel level in a tank onboard a vehicle, such as the satellite 300 of FIG. 3, may be determined using the method described in FIG. 4. To illustrate, a computing device onboard the satellite, such as the controller 322, may receive information indicative of capacitance between the inner surface of the tank 310 and the vane 312 from the capacitance sensing device 320. The controller 322 may calculate the amount of liquid that is in the tank 310 based on the received information that is indicative of the capacitance. Information indicating the amount of liquid in the tank may then be transmitted, e.g., by the transmitter 324, to the ground station 334. Alternately or in addition, the information indicative of the capacitance may be transmitted by the transmitter 324 to the ground station 334 via the satellite downlink signal 330. A computing device at the ground station 334 may calculate the amount of liquid that is in the tank 310 based on the received information that indicates the measured capacitance. Thus, the tank 310 can provide fluid level sensing without the addition of level sensing hardware inside the tank 310.

Figure 5:
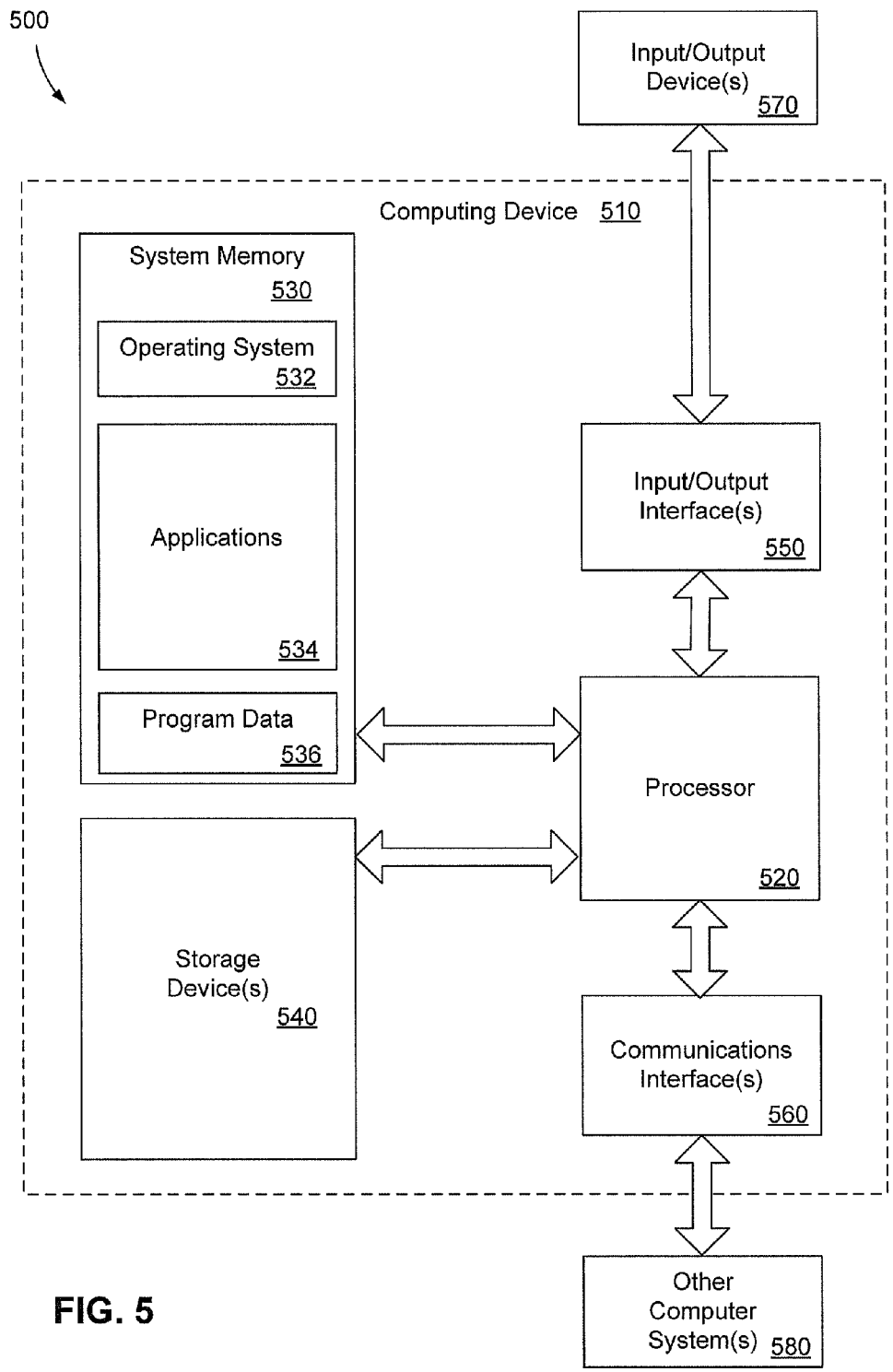
FIG. 5 is a block diagram of a general purpose computer system operable to perform computer-implemented methods or process computer-executable instructions according to a particular embodiment.

FIG. 5 is a block diagram of a general purpose computer system 500 operable to perform computer-implemented methods or to process computer-executable instructions to determine an amount of a fluid in a tank based on a capacitance measurement. The computer system 500 may be positioned near the tank such as onboard a satellite with the tank. For example, the computer system 500 may be a portion of or may be included within the controller 332 of FIG. 3. Alternately or in addition, the computer system 500 may be located remote from the tank. For example, the computer system 500 may be located at a ground station, such as the ground station 334 of FIG. 3 and may receive information indicative of the capacitance measurement via the satellite downlink 330 or via another communication signal.

In an illustrative embodiment, a computing device 510 of the computing system 500 may include at least one processor 520. The processor 520 may be configured to execute instructions to implement a method of determining an amount of fluid in a tank based on a capacitance measurement. The processor 520 may communicate with a system memory 530, one or more storage devices 540, and one or more input/output devices 570, via input/output interfaces 550.

The system memory 530 may include volatile memory devices, such as random access memory (RAM) devices, and nonvolatile memory devices, such as read-only memory (ROM), programmable read-only memory, and flash memory. The system memory 530 may include an operating system 532, which may include a basic input/output system (BIOS) for booting the computing device 510 as well as a full operating system to enable the computing device 510 to interact with users, other programs, and other devices. The system memory 530 may also include one or more application programs 534.

The processor 520 also may communicate with one or more storage devices 540. The storage devices 540 may include nonvolatile storage devices, such as magnetic disks, optical disks, or flash memory devices. In an alternative embodiment, the storage devices 540 may be configured to store the operating system 532, the applications 534, the program data 536, or any combination thereof. The processor 520 may communicate with the one or more communication interfaces 560 to enable the computing device 510 to communicate with other computing systems 580.

The disclosed embodiments utilize information (e.g., the measured capacitance) that is directly related to the amount of fluid that is remaining inside of the tank, unlike other techniques that rely upon outside factors to determine an estimate of the fluid remaining. For example, the gas law estimation above requires multiple measurements (e.g., temperature and pressure inside the tank) thereby having multiple sources for error, uses hardware inside the tank (e.g., temperature and pressure probes), and indirectly calculates the amount of fluid remaining in the tank by determining a volume of a pressurizing gas that is present in the tank. In another example, the thermal propellant gauging method may be subject to error based on the placement of the temperature sensors and heaters. Further, the thermal propellant gauging method requires that temperatures sensors be present in the tank. Accuracy of the thermal propellant gauging method relies on accurate measurement of heat applied to the tank and to the fluid and may be influenced by whether the heat is applied uniformly. Further, complex mathematical simulation models may be used which may be cumbersome and may be subject to their own errors (such as uncertainty regarding heating due to sunlight when a satellite passes into or out of eclipse). In yet another example, the book-keeping method described above uses a known starting volume of the fluid in the tank and calculates fuel remaining indirectly by subtracting fuel used based on flow rates and times. Inaccuracies in the starting volume and in each measurement used to estimate the fluid use may accumulate over multiple individual fluid uses to a large error when the fuel tank is nearly empty. Accordingly, the disclosed embodiments may enable satellites (and possibly other vehicles) to remain in service longer and at lighter weight. Additionally, the disclosed embodiments do not introduce new hardware (e.g., heating devices, pressure measurement devices, etc.) into a tank system. Thus, weight and complexity of the tank may be reduced. Additionally, design complexity is reduced, which may reduce overall system integration complications.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A tank comprising:
   a wall having an inner surface, wherein an insulating layer is disposed on a first portion of the inner surface;
   a vane that is disposed within the tank and that is configured to facilitate extraction of a fluid from the tank, wherein the vane comprises an electrically conductive material;
   a first connector to electrically couple a portion of the wall to a capacitance sensing device; and
   a second connector to electrically couple a portion of the vane to the capacitance sensing device,
   wherein, when the capacitance sensing device is coupled to the first connector and is coupled to the second connector, the capacitance sensing device is operable to measure a capacitance between the portion of the vane and the portion of the wall,
   wherein the capacitance sensing device is coupled to a controller, the controller operable to receive information representative of the capacitance between the portion of the vane and the portion of the wall and to apply a function to the information representative of the capacitance between the portion of the vane and the portion of the wall to determine an amount of the fluid remaining in the tank, and wherein the function is associated with a relationship between the amount of the fluid that is contained in the tank and the capacitance.

2. The tank of claim 1, wherein an insulating material is disposed between the vane and the inner surface of the wall.

3. The tank of claim 1, further comprising a second vane that is disposed within the tank and that is configured to facilitate extraction of the fluid from the tank.

4. The tank of claim 1, wherein the inner surface of the wall comprises an electrically conductive material.

5. The tank of claim 1, wherein the capacitance measured by the capacitance sensing device decreases as a level of the fluid in the tank decreases.

6. The tank of claim 1, further comprising an outlet, wherein the vane and the inner surface of the wall form boundaries of a capillary channel, the capillary channel facilitating movement of the fluid toward the outlet.

7. The tank of claim 6, wherein the capacitance measured by the capacitance sensing device decreases in response to fluid in the capillary channel becoming discontinuous.

8. A system comprising:
a processor; and
a memory accessible to the processor, the memory including instructions that are executable by the processor to:
receive information indicative of a capacitance between an inner surface of a wall of a tank and a vane disposed within the tank, wherein an insulating layer is disposed on a first portion of the inner surface; and
apply a function to the information indicative of the capacitance between the inner surface of the wall and the vane to determine an amount of liquid that is contained in the tank, wherein the function is associated with a relationship between the amount of liquid that is contained in the tank and the capacitance.

9. The system of claim 8, wherein the insulating layer is resistant from corrosion.

10. The system of claim 8, wherein a second insulating layer is disposed on the vane.

11. The system of claim 8, wherein the inner surface of the wall comprises an electrically conductive material.

12. The system of claim 8, wherein the capacitance decreases as the amount of the liquid contained in the tank decreases.

13. The system of claim 8, wherein the vane and the inner surface of the wall form boundaries of a capillary channel, the capillary channel facilitating movement of the liquid toward an outlet of the tank.

14. The system of claim 8, wherein the information is received via a downlink signal from a satellite, wherein the tank is onboard the satellite.

15. The system of claim 8, further comprising receiving second information indicative of the amount of the liquid that is contained in the tank via a downlink signal from a satellite, wherein the tank is onboard the satellite.

16. A mobile platform comprising:
a tank, wherein an insulating layer is disposed on a first portion of an inner surface of a wall of the tank;
a vane that is disposed within the tank and that is configured to facilitate extraction of liquid from the tank, wherein the vane comprises an electrically conductive material; and
a capacitance sensing device coupled to the tank and to the vane, wherein the capacitance sensing device is configured to measure a capacitance between the vane and the inner surface of the wall of the tank,
wherein the capacitance sensing device is communicatively coupled to a controller, the controller operable to receive information representative of the capacitance between the vane and the inner surface of the wall and to apply a function to the information representative of the capacitance between the vane and the inner surface of the wall to determine an amount of the liquid remaining in the tank, wherein the function is associated with a relationship between the amount of the liquid that is contained in the tank and the capacitance.

17. The mobile platform of claim 16, wherein the vane is further configured to inhibit sloshing of the liquid in the tank.

18. The mobile platform of claim 16, further comprising a propulsion system coupled to the tank, wherein the liquid comprises a fuel that is for use by the propulsion system.

19. The mobile platform of claim 16, wherein the measured capacitance decreases as the amount of the liquid contained in the tank decreases.

20. The mobile platform of claim 16, wherein the vane and the wall form boundaries of a capillary channel, the capillary channel facilitating movement of the liquid toward an outlet of the tank, and wherein the measured capacitance changes when a level of the liquid in the tank is insufficient to fill the capillary channel.

* * * * *